United States Patent
Lee et al.

(10) Patent No.: US 8,432,129 B2
(45) Date of Patent: Apr. 30, 2013

(54) WIRELESS CHARGING SYSTEM AND METHOD

(75) Inventors: Chang Ki Lee, Seoul (KR); Won Bae Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 441 days.

(21) Appl. No.: 12/655,021

(22) Filed: Dec. 22, 2009

(65) Prior Publication Data

US 2010/0156347 A1    Jun. 24, 2010

(30) Foreign Application Priority Data

Dec. 24, 2008   (KR) .................. 10-2008-0133078

(51) Int. Cl.
*H02J 7/00*      (2006.01)

(52) U.S. Cl.
USPC .................................................. 320/108

(58) Field of Classification Search .............. 320/108; 455/41.1, 343.1–343.6, 573; 340/538.16, 340/854.8, 870.31, 870.32
See application file for complete search history.

(56) References Cited

U.S. PATENT DOCUMENTS

| | | | |
|---|---|---|---|
| 6,803,744 B1 * | 10/2004 | Sabo | 320/108 |
| 7,880,338 B2 * | 2/2011 | Jin | 307/104 |
| 7,952,322 B2 * | 5/2011 | Partovi et al. | 320/108 |
| 8,067,921 B2 * | 11/2011 | Sip et al. | 320/108 |
| 2008/0116847 A1 * | 5/2008 | Loke et al. | 320/108 |
| 2010/0072825 A1 * | 3/2010 | Azancot et al. | 307/104 |
| 2012/0043931 A1 * | 2/2012 | Terao et al. | 320/108 |

* cited by examiner

*Primary Examiner* — Richard V Muralidar

(57) ABSTRACT

A wireless charging system can optimize charging efficiency regardless of a location of a mobile terminal. The wireless charging system wirelessly charges a mobile terminal using electromagnetic induction between a first coil included in a charging pad and a second coil included in the mobile terminal. The charging pad can detect a location of the mobile terminal on the charging pad. The charging pad can move the first coil to correspond to the detected location of the mobile terminal; and supply power to the first coil and charging a battery.

20 Claims, 6 Drawing Sheets

WIRELESS CHARGING SYSTEM AND METHOD

CROSS-REFERENCE TO RELATED APPLICATION(S) AND CLAIM OF PRIORITY

The present application is related to and claims priority to an application entitled "WIRELESS CHARGING SYSTEM AND METHOD" filed in the Korean Intellectual Property Office on Dec. 24, 2008 and assigned Serial No. 10-2008-0133078, the contents of which are incorporated herein by reference.

TECHNICAL FIELD OF THE INVENTION

The present invention relates to a wireless charging system and method, and more particularly, to a wireless charging system and method for a mobile terminal that can optimize charging efficiency regardless of a location of a mobile terminal.

BACKGROUND OF THE INVENTION

Nowadays, mobile terminals provide various functions such as a wireless Internet function, electronic note function, multimedia photographing and reproducing function, and game player function, digital broadcasting function in addition to a basic communication function. Such a mobile terminal generally uses a battery for portability.

The battery of the mobile terminal requires electric charging. A method of charging the battery can be classified into wired charging and wireless charging. The wired charging method is generally used, however, a wireless charging system using an electromagnetic induction phenomenon has been developed. Such a wireless charging system applies power to a charging pad including a coil (hereinafter, a first coil) at the inside thereof, and charges a battery using an induced current generating in a coil (hereinafter, a second coil) included in a mobile terminal, or a battery using a magnetic field generating in the first coil. That is, the wireless charging system can easily charge a battery by positioning the mobile terminal on a charging pad generating a magnetic field. However, such a wireless charging system has different charging efficiency according to a location relationship of the first coil and the second coil. In other words, when the first coil and the second coil are positioned to correspond, the wireless charging system has the best charging efficiency. That is, the wireless charging system should be positioned at the mobile terminal at a specified location in order to sustain optimum charging efficiency. In order to solve the problem, conventionally, a method of mounting a plurality of first coils, or a method of largely forming the first coil in order to cover an entire charging pad area was used. However, such a conventional method has a problem that wireless communication performance is deteriorated due to an influence of a magnetic field generating by the first coil and because the magnetic field is induced in a high and wide area, performance and a lifetime of parts of a mobile terminal may be influenced. Therefore, a wireless charging system and method in which a magnetic field generated by the first coil does not deteriorate wireless communication performance of the mobile terminal and that secure stability of the mobile terminal and that optimize charging efficiency are requested.

SUMMARY OF THE INVENTION

To address the above-discussed deficiencies of the prior art, it is a primary object to provide a wireless charging system and method that secure stability of a mobile terminal by minimizing an influence on performance and a lifetime of parts of the mobile terminal, and that have no influence on wireless communication performance, and that sustain optimum charging efficiency regardless of a location of the mobile terminal.

In accordance with an aspect of the present invention, a method for wirelessly charging a mobile terminal using electromagnetic induction between a first coil included in a charging pad and a second coil included in the mobile terminal includes: detecting a location of the mobile terminal on the charging pad; moving the first coil to correspond to the detected location of the mobile terminal; and supplying power to the first coil and charging a battery.

In accordance with another aspect of the present invention, a wireless charging system using an electromagnetic induction phenomenon includes: a charging pad including a first coil that generates a magnetic field when power is supplied; and a mobile terminal including a second coil that charges a battery using an induction current induced to the second coil when the magnetic field is generated in the first coil, wherein the charging pad determines a contact location of the mobile terminal and moves the first coil to correspond to the location of the mobile terminal.

In accordance with another aspect of the present invention, an apparatus for charging a battery of a mobile terminal using electromagnetic induction includes: a charging pad comprising a first coil configured to generate a magnetic field when power is supplied, wherein the first coil is adapted to electromagnetically couple to a second coil included in a a mobile terminal such that an induction current is induced to the second coil in response to a magnetic field generated in the first coil, and wherein the charging pad is configured to determine a location of the mobile terminal and move the first coil to correspond to the location of the mobile terminal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminal.

While the present invention may be embodied in many different forms, specific embodiments of the present invention are shown in drawings and are described herein in detail, with the understanding that the present disclosure is to be considered as an exemplification of the principles of the invention and is not intended to limit the invention to the specific embodiments illustrated.

In the following description, a "charging pad" is a charging device for wireless charging of a mobile terminal. "Charging efficiency" indicates a degree in which electric power supplied for charging in the charging pad is transmitted to the mobile terminal by electromagnetic induction phenomenon.

Figure 1:
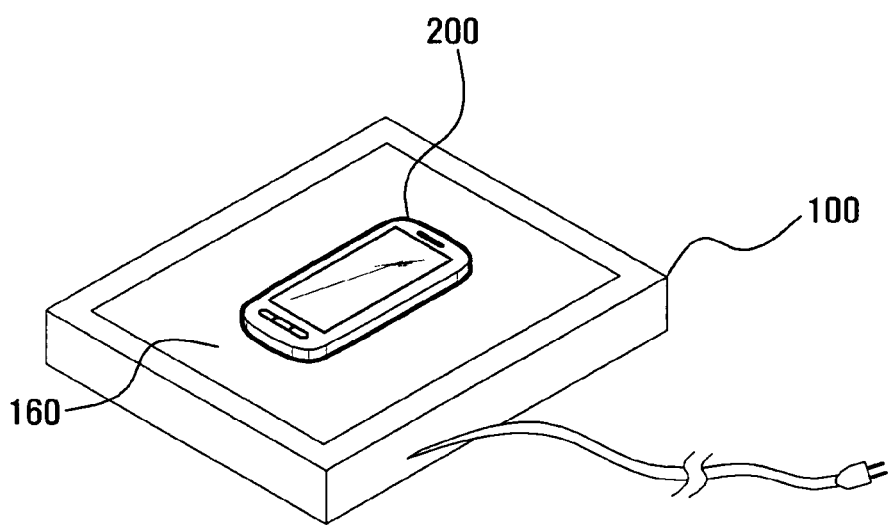
FIG. 1 illustrates a wireless charging system according to an exemplary embodiment of the present invention.
Figure 2A:
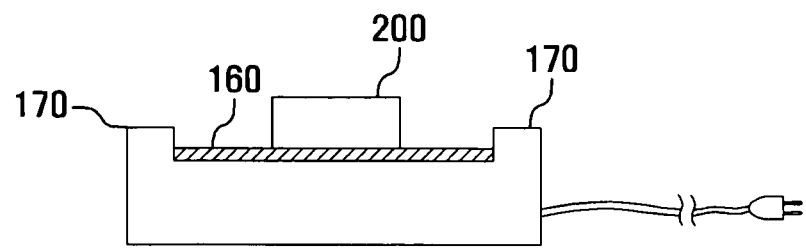
FIGS. 2A and 2B illustrate cross-sectional views of charging pads in the wireless charging system of FIG. 1.
Figure 2B:
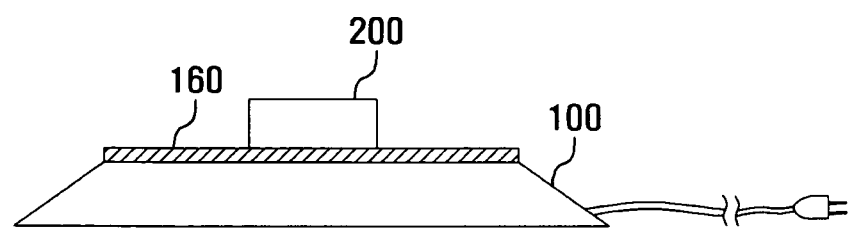

FIG. 1 illustrates a wireless charging system according to an exemplary embodiment of the present invention. FIGS. 2A and 2B illustrate cross-sectional views of charging pads in the wireless charging system of FIG. 1.

Referring to FIGS. 1, 2A, and 2B, the wireless charging system according to the present exemplary embodiment includes a mobile terminal 200 and a charging pad 100.

The charging pad 100 is a device for wireless charging a battery of the mobile terminal 200. The charging pad 100 includes a first coil that receives power to generate a magnetic field and a detection unit 160 that detects a contact and a contact location of the mobile terminal 200 on the charging pad 100. When a contact of the mobile terminal 200 is detected through the detection unit 160, the charging pad 100 determines a location of the mobile terminal 200 and moves the first coil to correspond to the mobile terminal 200. Thereby, the charging pad 100 can substantially always sustain optimum charging efficiency regardless of a location of the mobile terminal 200. Further, when the mobile terminal 200 contacts on the charging pad 100, the charging pad 100 determines whether the mobile terminal 200 is a certified device and charges only a certified mobile terminal.

The charging pad 100 includes a projection 170 at an edge thereof, as shown in FIG. 2A, or includes an inclined edge, as shown in FIG. 2B. This is to prevent charging efficiency from becoming deteriorated by positioning a mobile terminal at a location at which the first coil cannot move. A detailed configuration of the charging pad 100 is described later with reference to FIG. 3.

The mobile terminal 200 can perform wireless charging and includes a second coil that can generate an induced current according to a change of a magnetic field generating in the charging pad 100. The mobile terminal 200 charges a battery using the induced current. Here, a wireless charge principle uses a Maxwell's equation and becomes apparent to those skilled in the art. Therefore a detailed description thereof is omitted. Further, the mobile terminal 200 determines charging efficiency by determining the induced current or voltage value. In this case, if the charging efficiency is less than a preset reference value, the mobile terminal 200 transmits a control signal for moving a location of the first coil to the charging pad 100. Further, the mobile terminal 200 determines a charging state of a battery and transmits, if electric charging is complete, a charging completion signal to the charging pad 100. For this, the mobile terminal 200 performs magnetic field communication using the charging pad 100 and a change of a magnetic field. A detailed description of a configuration of the mobile terminal 200 is described with reference to FIG. 4.

By determining a location of the mobile terminal 200 and moving the first coil and the second coil to correspond thereto, the wireless charging system optimizes charging efficiency regardless of a location of the mobile terminal 200. Therefore, a charging time period can be minimized and a charging pad 100 for a general mobile terminal, not a specific mobile terminal can be designed.

Figure 3:
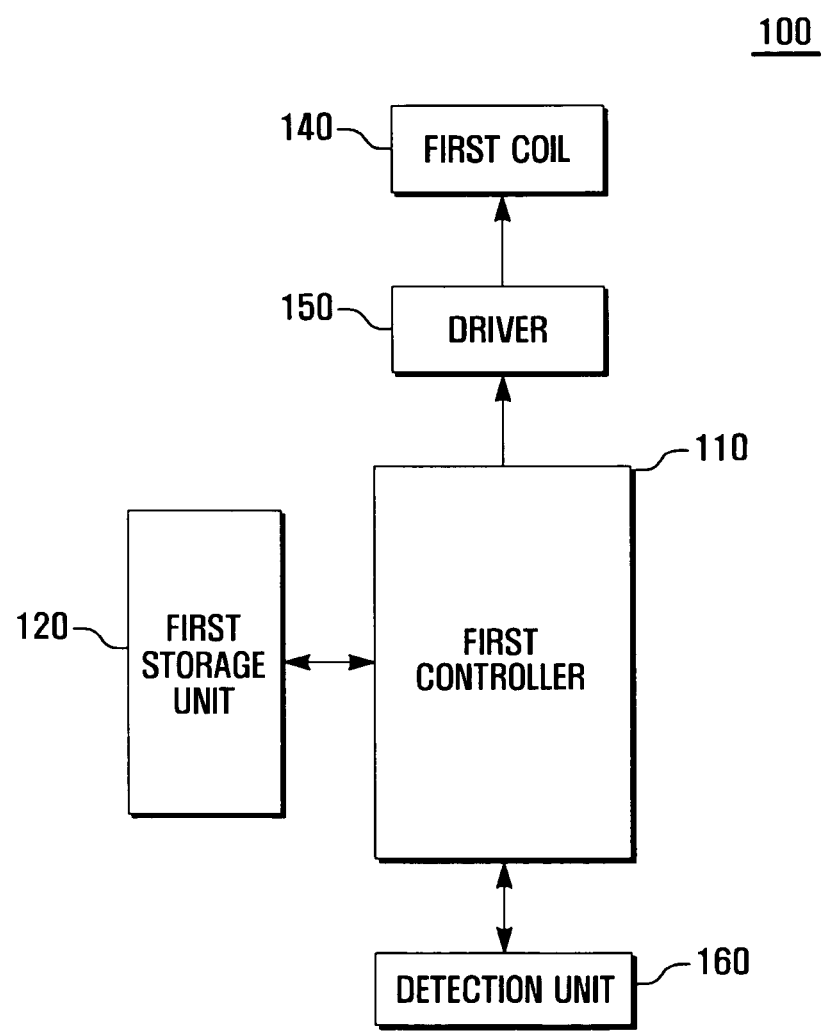
FIG. 3 illustrates a configuration of the charging pad of FIGS. 2A and 2B.

FIG. 3 illustrates a configuration of the charging pad 100 of FIGS. 2A and 2B.

Referring to FIG. 3, the charging pad 100 according to the present exemplary embodiment includes a first controller 110, first storage unit 120, first coil 140, driver 150, and detection unit 160.

The detection unit 160 is a sensor that detects a contact and a location of the mobile terminal 200. The detection unit 160 can use a pressure detection sensor and is positioned at an upper surface of the charging pad 100 with which the mobile terminal 200 contacts. That is, when the mobile terminal 200 contacts the charging pad 100, the detection unit 160 detects a location of the mobile terminal 200 and outputs the location of the mobile terminal 200 to the first controller 110. In this case, the first controller 110 controls the driver 150 to move the first coil 140 to a location where the mobile terminal 200 is positioned.

The driver 150 moves the first coil 140 by the control of the first controller 110. That is, the driver 150 moves the first coil 140 to a location corresponding to the mobile terminal 200 by the control of the first controller 110. Thereby, the wireless charging system according to the present exemplary embodiment can substantially always sustain optimum charging efficiency regardless of a location of the mobile terminal 200.

The driver 150 can be designed with various methods. For example, the driver 150 includes a first driver for moving in a horizontal direction and a second driver for moving in a vertical direction.

The first coil 140 can be an electromagnet for generating a magnetic field when power is supplied. The first coil 140 may be, for example, a solenoid. A magnetic field generated in the first coil 140 induces a magnetic field to the second coil included in the mobile terminal 100. The magnetic field induced to a second coil can generate the induced current. Particularly, in the present exemplary embodiment, when the charging is requested, the first coil 140 is moved to a location corresponding to the mobile terminal 200 on the charging pad 100 by the driver 150. It is preferable that the first coil 140 is dimensioned to be small in size to prevent wireless communication performance of the mobile terminal 200 from being deteriorated by an influence of a magnetic field.

The first storage unit 120 stores a program necessary for operating a function of the charging pad 100. Particularly, in the present exemplary embodiment, the first storage unit 120 stores a communication program for communicating with the mobile terminal 200. The communication program may be a communication program using a change of a magnetic field. Further, the first storage unit 120 stores first certification information for determining whether the mobile terminal 200 is a chargeable device. The reason of performing a certification process is to prevent damage, for example overheating or magnetic damage of an uncertified electronic device due to a magnetic field generated in the first coil 140.

The first controller 110 controls general operations of the charging pad 100 and a signal flow between units, and performs a data processing function. Particularly, in the present exemplary embodiment, when a contact of the mobile terminal 200 is detected through the detection unit 160, the first controller 120 determines whether the mobile terminal 200 is a chargeable certified device. This is to prevent, when an object such as a purse is positioned on the charging pad 100, a magnetic strip of a credit card and a traffic card from being damaged due to a magnetic field.

When the mobile terminal 200 is a certified device, the first controller 110 determines a location of the mobile terminal 200 and moves the first coil 140 to a location corresponding to the mobile terminal 200. Thereafter, when a control signal for requesting location movement of the first coil 140 is received from the mobile terminal 200, the first controller 110 moves a location of the first coil 140. The reason of moving the location of the first coil 140 according to the control signal is that charging efficiency may not optimize with a single position because the second coil is positioned at different locations in each mobile terminal 200.

When a charge completion signal is receive from the mobile terminal 200, the first controller 110 terminates electric charging by interrupting power supply to the first coil 140. In this case, the first controller 110 moves the first coil 140 to a location that does not correspond to the mobile terminal 200. This is to prevent phenomenon in which electric charging is not terminated due to power being leaked to the first coil 140.

The first controller 110 performs wireless communication by generating a magnetic field with the mobile terminal 200 through the second coil. However, the charging pad 100 is not limited to a charging pad 100 for performing wireless communication with the mobile terminal 200 using a magnetic field. The charging pad 100 may include, for example, a separate short range wireless communication module.

Figure 4:
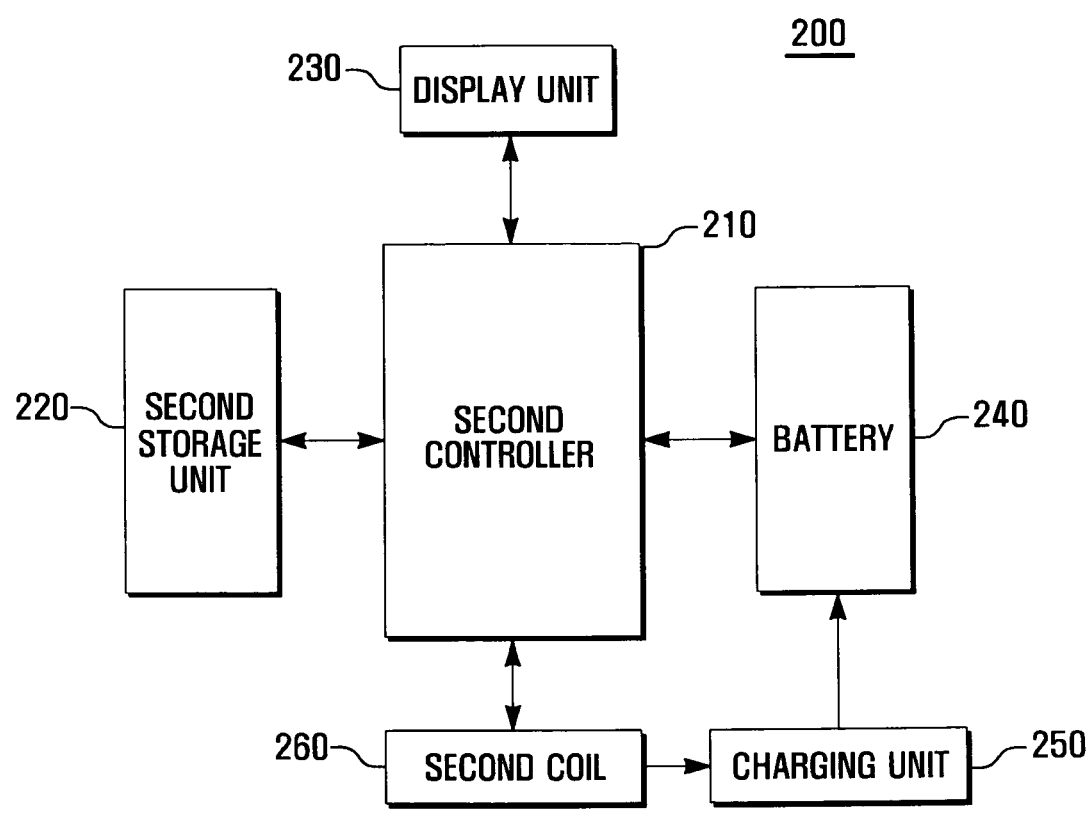
FIG. 4 illustrates a configuration of a mobile terminal in the wireless charging system of FIG. 1.

FIG. 4 illustrates a configuration of the mobile terminal 200 in the wireless charging system of FIG. 1.

Referring to FIG. 4, the mobile terminal 200 according to the present exemplary embodiment includes a second controller 210, second storage unit 220, display unit 230, battery 240, charging unit 250, and second coil 260.

When a magnetic field generates in the first coil 140 of the charging pad 100, the second coil 260 induces a magnetic field according to electromagnetic induction phenomenon. In this case, the second coil 260 generates an induced current. Such an electromagnetic induction principle is well known and therefore a detailed description thereof is omitted.

It is preferable that the second coil 260 is shielded from another electronic circuit. This is to prevent a circuit from being damaged by a magnetic field generated in the second coil 260.

In the foregoing description, the second coil 260 includes a separate structure, however the present invention is not limited thereto. That is, the second coil 260 may be included in the battery 240.

The charging unit 250 charges the battery 240 using the induced current. For this, the charging unit 250 includes a charging circuit and an overcurrent or overvoltage protection circuit.

In order to drive the mobile terminal 200, the battery 240 supplies power to each of the units. The battery 240 can be detached and may be a rechargeable battery. As described above, the battery 240 may include the second coil 260.

The display unit 230 displays user data input by a user, function setting information, or various information provided to the user as well as various menu screens of the mobile terminal 200. Further, when the display unit 230 is formed as a touch screen, the display unit 230 can be operated as an input means. The display unit 230 can be formed with a liquid crystal display (LCD) or organic light emitting diodes (OLED). Particularly, in the present exemplary embodiment, the display unit 230 can display a state of the battery 240 under the control of the second controller 210. That is, the display unit 230 can display a residual amount of a battery, an icon notifying that a battery is being charged, and a charging completion message by the control of the second controller 210.

The second storage unit 220 can store user data as well as a program necessary for a function operation of the mobile terminal 200 according to the present exemplary embodiment. The second storage unit 220 includes a program area and a data area.

The program area stores a program for controlling general operations of the mobile terminal 200 and an operating system for booting the mobile terminal 200. Particularly, in the present exemplary embodiment, the program area includes a wireless communication program for performing communication using a change of a magnetic field.

The data area stores data generated according to a use of the mobile terminal 200 and can store information corresponding to a phonebook, audio data, content, or user data. Particularly, in the present exemplary embodiment, the data area stores a reference value for determining charging efficiency. If charging efficiency is less than the reference value, the second controller 210 determines that the first coil 140 and the second coil 260 are not positioned at corresponding positions and transmits a control signal for requesting location movement of the first coil 140 to the charging pad 100.

The second controller 210 controls general operations of the mobile terminal 200 and a signal flow between units of the mobile terminal 200, and performs a data processing function. Particularly, in the present exemplary embodiment, if the charging efficiency is less than the reference value, the second controller 210 transmits a control signal for requesting to move a location of the first coil 140 to the charging pad 100. Thereby, the wireless charging system according to the present exemplary embodiment can sustain optimum charging efficiency. Further, the second controller 210 determines a charging state of the battery 240 and when electric charging is complete, and the second controller 210 terminates electric charging by transmitting a charging complete state to the charging pad 100. For this, the second controller 210 performs wireless communication using a change of a magnetic field.

Further, although not shown, the mobile terminal 200 may selectively include units having an additional function, such as a camera module for photographing an image or a moving picture, broadcasting reception module for receiving digital broadcasting, audio signal output device such as a speaker, sound signal input device such as a microphone, and digital sound reproduction module such as an MP3 module. Such units can be variously modified according to a convergence trend of digital devices and be additionally included in the mobile terminal 200 according to the present exemplary embodiment.

The charging pad 100 and the mobile terminal 200 perform wireless communication using a magnetic field, however the present invention is not limited thereto. That is, a wireless charging system according to the present exemplary embodiment may further include a separate wireless communication module (for example, a Bluetooth® module, ZigBee module, Ultra Wide Band (UWB) module, or infrared ray communication module).

Figure 5:
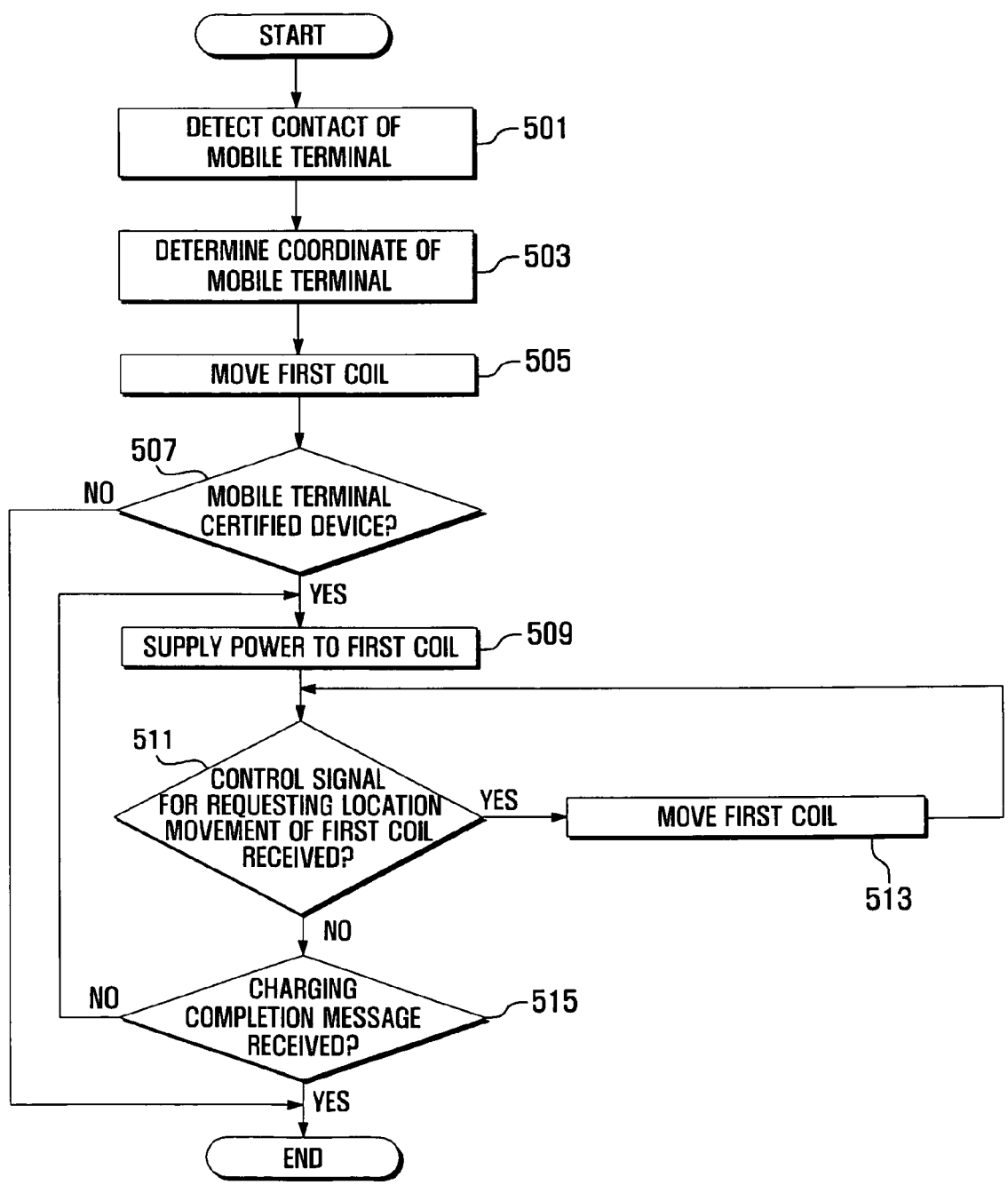
FIG. 5 illustrates a charging process in the charging pad of FIG. 3.

FIG. 5 illustrates a charging process in the charging pad 100 of FIG. 3.

In order to perform a charging operation, the mobile terminal 200 is positioned on the charging pad 100.

Referring to FIG. 5, the first controller 110 determines a contact of the mobile terminal 200 on the charging pad 100 using the detection unit 160 (block 501). Here, the detection unit 160 may be a pressure detection sensor.

The first controller 110 determines a coordinate of the mobile terminal 200 (block 503).

The first controller 110 moves the first coil 140 to a location corresponding to that of the mobile terminal 200 (block 505). Here, the first coil 140 is a kind of an electromagnet and generates a magnetic field when power is supplied. The first coil 140 may be, for example, a solenoid. It is preferable that the first coil 140 is formed small in consideration of mobility and in order to minimize an influence of a magnetic field generated when power is supplied exerts on another electronic device.

The first controller 110 determines whether the mobile terminal 200 is a certified device (block 507). For this, the charging pad 100 and the mobile terminal 200 perform magnetic field communication using a change of a magnetic field. Alternatively, the charging pad 100 and the mobile terminal 200 can perform communication using a separate wireless communication module (for example, a Bluetooth® module, ZigBee module, infrared ray communication module, or UWB module). For this, the charging pad 100 according to the present exemplary embodiment stores first certification information for determining whether the mobile terminal 200 is a chargeable device, and the mobile terminal 200 stores second certification information representing that the mobile terminal 200 is a chargeable device.

If the mobile terminal 200 is not a certified device, the first controller 110 terminates a charging process according to the present exemplary embodiment. If the mobile terminal 200 is a certified device, the first controller 110 supplies power to the first coil 140 and starts wireless charging according to the present exemplary embodiment (block 509). In this case, the mobile terminal 200 positioned on the charging pad 100 charges a battery using an induced current generated by a magnetic field generating in the first coil 140.

The first controller 110 determines whether a control signal for requesting location movement of the first coil 140 is received (block 511). The mobile terminal 200 measures charging efficiency, and when the charging efficiency is less than a preset reference value, the control signal is a signal transmitting to optimize charging efficiency.

If the control signal is received at block 511, the first controller 110 moves the first coil 140 in a specific direction by a predetermined distance (block 513). In this case, the mobile terminal 200 changes a moving direction of the first coil 140 according to increase or decrease of charging efficiency. That is, after the first coil 140 is moved, if charging efficiency decreases, the mobile terminal 200 controls the first coil 140 to move in an opposite direction. Thereafter, the process returns to block 511 and the first controller 110 determines whether a control signal for requesting location movement of the first coil 140 is received. That is, block 511 is repeated until the charging efficiency becomes a preset reference value or more.

If charging efficiency is a preset reference value or more at block 511 and if the control signal is not received, the first controller 110 determines whether a charging completion message is received from the mobile terminal 200 (block 515).

If a charging completion message is not received from the mobile terminal 200, block 515 continues to perform. If a charging completion message is received from the mobile terminal 200, the first controller 110 terminates a charging process according to the present exemplary embodiment. In this case, the first controller 110 interrupts power supplied to the first coil 140. Thereafter, the first controller 110 moves the first coil 140 to a location that does not correspond to the mobile terminal 200. This is to prevent phenomenon in which electric charging is not terminated as a result of power leaking to the first coil 140.

Figure 6:
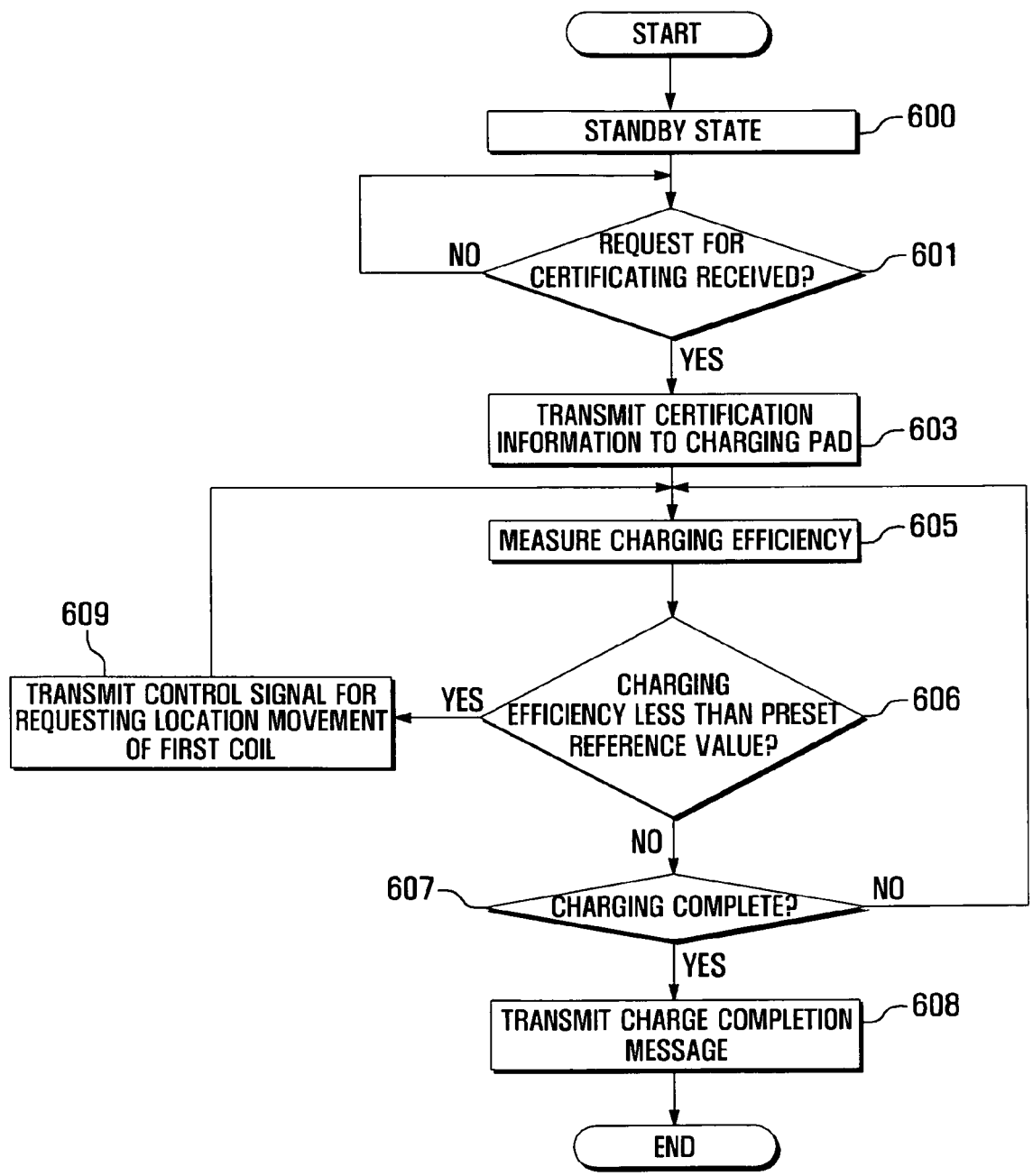
FIG. 6 illustrates a process of charging the mobile terminal of FIG. 4.

FIG. 6 illustrates a process of charging the mobile terminal 200 of FIG. 4.

The mobile terminal 200 is positioned on the charging pad 100 and a certification process of the mobile terminal 200 is illustrated.

Referring to FIG. 6, the second controller 210 is in a standby state (block 600).

The second controller 210 determines whether a request for certificating is received (block 601). The request for certificating is performed to determine whether the mobile terminal 200 is a chargeable terminal.

If a request for certificating is not received, the second controller 210 continues to perform block 601. If a request for certificating is received, the second controller 210 transmits certification information to the charging pad 100 (block 603).

The second controller 210 determines an induced current or a voltage value generated in the second coil 260 and measures charging efficiency (block 605).

The second controller 210 determines whether the charging efficiency is less than a preset reference value (block 606).

If the charging efficiency is less than a preset reference value, the second controller 210 transmits a control signal for requesting location movement of the first coil 140 to the charging pad 100 (block 609). Thereafter, the process returns to block 605 and the second controller 210 measures charging efficiency. Such a process is repeated until the charging efficiency becomes a reference value or more.

If the charging efficiency is a preset reference value or more (block 606), the second controller 210 determines whether electric charging is complete (block 607).

If electric charging is not complete, block 607 continues to perform. If electric charging is complete, the second controller 210 transmits a charging completion message to the charging pad 100 (block 608). In this case, the charging pad 100, in response to receiving the charging completion message, interrupts power supply to the first coil 140, thereby terminating electric charging.

As described above, in a method of wireless charging according to the present invention, even if the mobile terminal 200 is not positioned at a predetermined location in order to optimize charging efficiency, optimum charging efficiency can be sustained and because optimum charging efficiency is substantially always sustained, a charging time period can be minimized, and the wireless charging method can be commonly used for various mobile terminals.

Further, by minimizing a size of the first coil included in the charging pad, an influence on performance and a lifetime of parts of the mobile terminal due to a magnetic field of the first coil can be minimized and stability of the mobile terminal can thus be secured.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for wirelessly charging a mobile terminal using electromagnetic induction between a first coil included in a charging pad and a second coil included in the mobile terminal, the method comprising:
   detecting a location of the mobile terminal on the charging pad;
   moving the first coil to correspond to the detected location of the mobile terminal;
   supplying power to the first coil for charging a battery in the mobile terminal; and
   when a charging efficiency is less than a preset reference value, receiving from the mobile terminal a control signal requesting a location movement of the first coil, and moving a location of the first coil according to the control signal.

2. The method of claim 1, further comprising determining whether the mobile terminal is a certified device.

3. The method of claim 1, wherein the charging efficiency is determined at the mobile terminal.

4. The method of claim 1, further comprising:
   when electric charging of the battery is complete, receiving from the mobile terminal a charging completion message.

5. The method of claim 4, further comprising, when the charging completion message is received, interrupting power supplied to the first coil.

6. The method of claim 5, further comprising moving, by the charging pad, the first coil not to correspond to the second coil.

7. A wireless charging system using electromagnetic induction, the wireless charging system comprising:
   a charging pad comprising a first coil configured to generate a magnetic field when power is supplied; and
   a mobile terminal comprising a second coil configured to charge a battery using an induction current induced to the second coil when the magnetic field is generated in the first coil;
   wherein the charging pad is configured to determine a contact location of the mobile terminal and move the first coil to correspond to the location of the mobile terminal,
   wherein the mobile terminal is configured to determine a charging efficiency and, when the charging efficiency is less than a preset reference value, transmit a control signal requesting a location movement of the first coil to the charging pad.

8. The wireless charging system of claim 7, wherein the charging pad comprises:
   a detection unit configured to detect a contact location of the mobile terminal;
   a driver adapted to enable movement of the first coil to correspond to the detected location of the mobile terminal;
   a first controller configured to determine whether the detected mobile terminal is a certified device and control, if the detected mobile terminal is a certified device, wireless charging; and
   a first storage unit configured to store first certification information for determining whether the mobile terminal is a chargeable device.

9. The wireless charging system of claim 8, wherein when the control signal for requesting the location movement of the first coil is received from the mobile terminal, the first controller controls the driver to move a location of the first coil.

10. The wireless charging system of claim 8, wherein when a charging completion message from the mobile terminal is received, the first controller interrupts power supplying for charging the battery in the mobile terminal to the first coil.

11. The wireless charging system of claim 10, wherein when the charging completion message is received, the first controller moves the first coil to a location that does not correspond to the second coil.

12. The wireless charging system of claim 8, wherein the detection unit is a pressure detection sensor.

13. The wireless charging system of claim 7, wherein the mobile terminal comprises:
   a charging unit configured to charge the battery using the induced current; and
   a second controller configured to determine whether electric charging of the battery is complete and transmit, if electric charging of the battery is complete, a charging completion message to the charging pad.

14. The wireless charging system of claim 13, wherein the mobile terminal further comprises a second storage unit configured to store second certification information representing that the mobile terminal is a chargeable device using the charging pad and the preset reference value.

15. An apparatus for charging a battery of a mobile terminal using electromagnetic induction, the apparatus comprising:
   a charging pad comprising a first coil configured to generate a magnetic field when power is supplied, wherein the first coil is adapted to electromagnetically couple to a second coil included in a a mobile terminal such that an induction current is induced to the second coil in response to a magnetic field generated in the first coil,
   wherein the charging pad is configured to determine a location of the mobile terminal and move the first coil to correspond to the location of the mobile terminal, and
   wherein the charging pad is further configured to, when a charging efficiency is less than a preset reference value, receive from the mobile terminal a control signal requesting a location movement of the first coil, and move a location of the first coil according to the control signal.

16. The apparatus of claim 15, wherein the charging pad comprises:
   a detection unit configured to detect a location of the mobile terminal;
   a driver configured to enable the movement of the first coil to correspond to the location of the mobile terminal;
   a first controller configured to determine whether the detected mobile terminal is a certified device and control, if the detected mobile terminal is a certified device, a wireless charging; and
   a first storage unit configured to store first certification information for determining whether the mobile terminal is a chargeable device.

17. The apparatus of claim 16, wherein when the control signal requesting the location movement of the first coil is received from the mobile terminal, the first controller controls the driver to move the location of the first coil.

18. The apparatus of claim 16, wherein when a charging completion message from the mobile terminal is received, the first controller interrupts power supplying for charging the battery in the mobile terminal to the first coil.

19. The apparatus of claim 18, wherein when the charging completion message is received, the first controller moves the first coil to a location that does not correspond to the second coil.

20. The apparatus of claim 15, wherein the charging efficiency is determined at the mobile terminal.

* * * * *